(12) United States Patent
Knoop et al.

(10) Patent No.: US 10,781,875 B2
(45) Date of Patent: Sep. 22, 2020

(54) DISC BRAKE

(71) Applicant: Meritor Heavy Vehicle Braking Systems (UK) Limited, Cwmbran, Gwent (GB)

(72) Inventors: Dietmar Knoop, Gwent (GB); Matthew McGinn, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 13 days.

(21) Appl. No.: 16/128,626

(22) Filed: Sep. 12, 2018

(65) Prior Publication Data

US 2019/0078631 A1    Mar. 14, 2019

(30) Foreign Application Priority Data

Sep. 12, 2017    (GB) .................................. 1714675.4

(51) Int. Cl.

| | | |
|---|---|---|
| *F16D 65/097* | (2006.01) | |
| *F16D 55/226* | (2006.01) | |
| *B60T 1/06* | (2006.01) | |
| *F16D 65/092* | (2006.01) | |
| *F16D 65/00* | (2006.01) | |

(Continued)

(52) U.S. Cl.
CPC .......... *F16D 65/0978* (2013.01); *B60T 1/065* (2013.01); *F16D 55/226* (2013.01); *F16D 55/2262* (2013.01); *F16D 65/092* (2013.01); *F16D 65/0056* (2013.01); *F16D 2055/0008* (2013.01); *F16D 2065/026* (2013.01); *F16D 2200/0021* (2013.01); *F16D 2250/0007* (2013.01); *F16D 2250/0023* (2013.01)

(58) Field of Classification Search
CPC ............. F16D 65/0972; F16D 65/0977; F16D 65/0978; F16D 65/0979; F16D 65/092; F16D 55/226; F16D 55/227
USPC .......................... 188/72.1, 72.2, 73.32, 73.38
See application file for complete search history.

(56) References Cited

U.S. PATENT DOCUMENTS 3,568,807 A * 3/1971 Harrison ............. F16D 65/0978
                                                188/73.32
3,677,373 A * 7/1972 Lucien .................. F16D 55/228
                                                188/73.32

(Continued)

FOREIGN PATENT DOCUMENTS

| CN | 107061562 A | 8/2017 |
|---|---|---|
| DE | 3839957 A1 | 5/1990 |

(Continued)

OTHER PUBLICATIONS

Great Britain Patent Office, Search Report for related Application Serial No. GB1714675.4, dated Nov. 21, 2017.

(Continued)

*Primary Examiner* — Robert A. Siconolfi
*Assistant Examiner* — San M Aung
(74) *Attorney, Agent, or Firm* — Brooks Kushman PC

(57) ABSTRACT

A disc brake having at least one brake pad, a brake caliper, an actuation mechanism, and a brake pad support structure. The brake pad has a moveable pad retainer formation to permit assembly and retention of the brake pad in the brake pad support structure such that the brake pad is held for operation of the disc brake.

20 Claims, 11 Drawing Sheets

(51) Int. Cl.
*F16D 65/02* (2006.01)
*F16D 55/00* (2006.01)

(56) References Cited

U.S. PATENT DOCUMENTS

| | | | | |
|---|---|---|---|---|
| 2014/0131148 A1* | 5/2014 | Plantan | ................ | F16D 65/097 188/73.38 |
| 2014/0196993 A1* | 7/2014 | Iraschko | ............... | F16D 55/226 188/73.32 |
| 2014/0251736 A1 | 9/2014 | Nanri | | |
| 2016/0160946 A1* | 6/2016 | Graaf | ................ | F16D 65/0978 188/73.38 |

FOREIGN PATENT DOCUMENTS

| | | | |
|---|---|---|---|
| DE | 102010019470 A1 | | 11/2011 |
| DE | 102010023143 | * | 12/2011 |
| EP | 0730107 A2 | | 9/1996 |
| GB | 2434624 A | | 8/2007 |
| WO | 2004074705 A1 | | 9/2004 |
| WO | 2014079870 A1 | | 3/2014 |

OTHER PUBLICATIONS

European Patent Office, Extended European Search Report for corresponding European Application No. 18192163.6-1012, dated Jan. 25, 2019.
EP Examination Report dated Mar. 10, 2020, for related European Appln. No. 18192163.6; 5 Pages.

\* cited by examiner

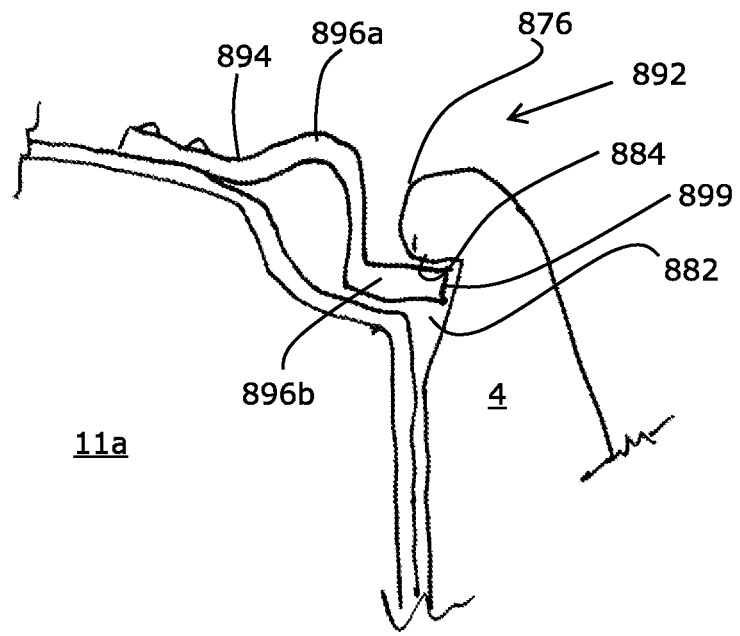
Fig 12
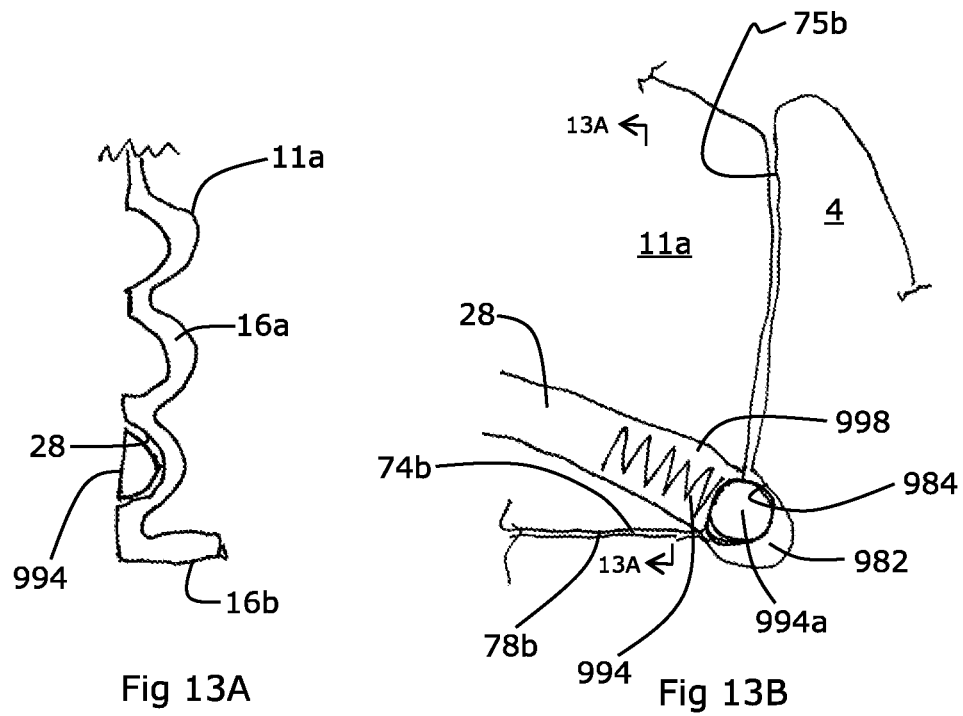
Fig 13A
Fig 13B

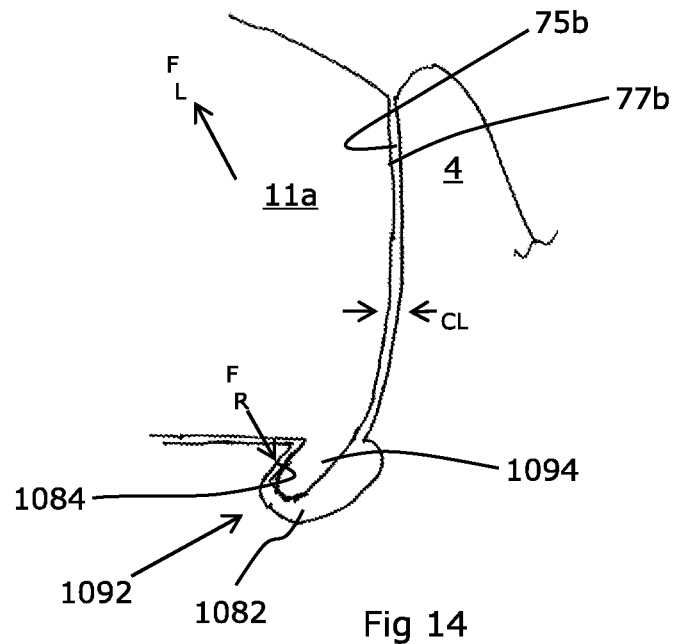
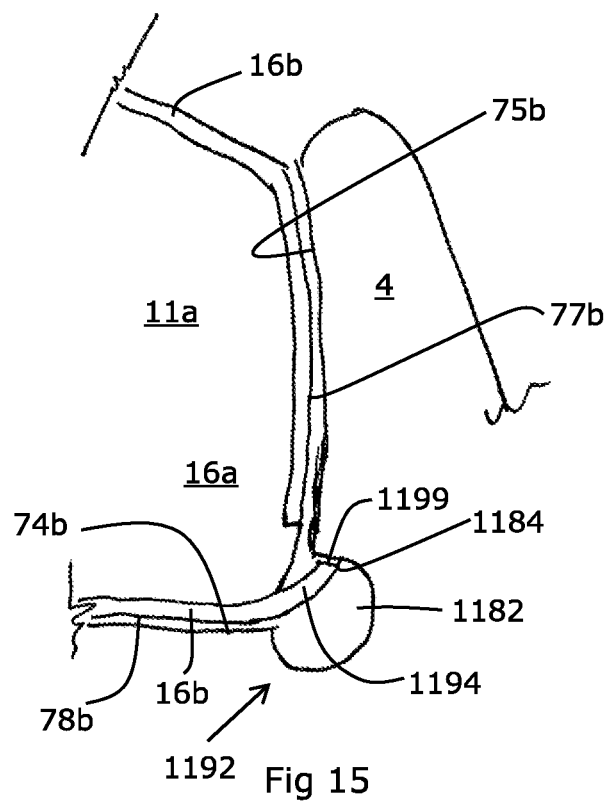

DISC BRAKE

TECHNICAL FIELD

The present invention relates to a disc brake. More particularly, but not exclusively, the present invention relates to an arrangement for the fitting and retention of brake pads of a disc brake, as well as to a brake pad for use in such as disc brake and methods of fitting and removal.

BACKGROUND

Braking systems of heavy trucks and buses generally use air under pressure as the operating medium. Typically, air actuators have a mechanical output which applies brake pads to the brake rotor via a lever or gear mechanism. The lever mechanism includes an operating shaft pivotable about two bearing surfaces on a common axis to urge one or more pistons against a brake pad via a cam surface. The shaft has a lever arm acted upon by the air actuator, and may include another generally shorter arm to actuate a wear adjuster mechanism. Traditionally, for larger brake pads, multiple pistons are provided to optimize pressure distribution on the brake pad backplate. A known braking mechanism of this type is shown in document WO2004/074705 (Knorr-Bremse). Traditionally, for lighter duty applications (e.g., lighter trucks or trailers of tractor-trailer units) with smaller brake pads a single piston is sufficient. An example of a brake of this type is EP0730107 (Perrot Bremsen).

In known heavy vehicle disc brakes (see FIG. 17) it is usual for the brake pads 111 to be fitted and removed from a carrier 104 of the disc brake 102 in a radial direction to the wheel center inward/outward direction via a radial opening in the brake caliper. This arrangement allows brake pad 111 replacement to occur without removal of the brake caliper. The brake pads 111 are held within the disc brake 102 by a pad retainer 192 that extends across the center of the brake pad 111 and leaf spring 193 that urges the pad in a radially inward direction. This is beneficial as calipers of heavy vehicle brakes are generally too heavy for them to be safely lifted and manipulated by one person, in contrast to disc brakes of light vehicles.

This approach to fitting and removal can be achieved with relatively little skill, but does not offer any particular functional benefits in terms of pad retention within the disc brake, fool proofing of fitting etc. It also requires the use of additional components, including the retainer bolt and springs, that may add to the overall weight and complexity of the disc brake and are susceptible to incorrect assembly leading to the safety of the brake potentially being compromised.

The present invention seeks to overcome or at least mitigate the problems of the prior art.

SUMMARY

A first aspect of the present invention provides A heavy vehicle disc brake, the heavy vehicle disc brake comprising: first and second brake pads for selectively contacting opposing inboard and outboard faces of a brake rotor respectively; a brake caliper for confining the first and second brake pads in at least an inboard-outboard direction; an actuation mechanism for selectively bringing the brake pads into contact with the rotor; and a first and a second brake pad support structure for restraining the first and second brake pads in a circumferential direction respectively; wherein at least one of the first and second brake pads comprises a moveable pad retainer formation to permit assembly and retention of the brake pad in the support structure such that the brake pad is held within support structure for operation of the disc brake.

Advantageously this permits the simple insertion and retention of a brake pad into its corresponding support structure without the requirement for additional components. This may increase the speed of a fitting operation, and reduce the risk of incorrect assembly. Providing the pad retainer formation on the brake pad means that if it is damaged in use, its function can be restored by replacing the brake pad, rather than a larger and more costly component such as a brake caliper or brake carrier. The arrangement may additionally reduce pad rattling.

The retainer formation may be configured to permit a push fit assembly of the brake pad in the support structure.

This arrangement further simplifies the assembly of a brake pad into its support structure by making assembly easy to achieve without tools.

The retention maybe achieved by interengagement of the pad retainer formation with a complementary formation of the support structure.

This arrangement provides secure and positive retention.

The formation may comprise a resilient element arranged to be deflected so as to achieve the interengagement.

This provides a convenient way to achieve the retention of the pad in the structure.

A disc brake wherein the resilient element comprises a leaf spring. A leaf spring may be readily integrated into a brake pad for interaction with a mounting structure.

The leaf spring may comprise at least a first curve in a first direction.

This arrangement of leaf spring provides for compressibility/flexibility of the leaf spring and a surface for interengagement with the support.

The leaf spring may further comprise a second curve in a second direction opposite to the first.

This provides additional compressibility/flexibility of the leaf spring.

The disc brake may comprise friction material and a backplate to support the friction material and the resilient element may be integrally and monolithically formed with the backplate.

Advantageously this may reduce the cost of manufacturing a brake pad that incorporates such a resilient element.

The backplate can optionally be formed at least in part from relatively thin sheet metal material for example, sheet metal less than 4 mm thick, and the resilient element is formed from this sheet metal material.

Advantageously this provides a convenient way of forming the resilient element.

The sheet metal material may have a peripheral flange, and if so, the resilient element may be formed from the flange. This may further simplify construction of the resilient element.

A disc brake wherein the first or second support structure for the brake pad comprises an abutment, the abutment being located such that the formation is able to move into contact with the abutment as part of the push fit operation.

The formation may comprise a feature, accessible by a user in a fully assembled state of the disc brake, to permit the disengagement of the brake pad from the support structure.

Advantageously, such a feature permits removal of the brake pad in a non-destructive manner.

The feature may be a slot or recess to receive a tool such as a screwdriver or a projection tab to permit disengagement without a tool.

The formation can optionally be located at a corner of the brake pad at which a radially outer surface and a circumferential surface of the brake pad intersect.

Advantageously this location is easiest for a user to access the formation in order to disengage the formation and allow the brake pad to be removed for inspection of replacement.

At least one of the first and second brake pads and the corresponding first and second support structures may comprise complementary profiles on circumferential faces thereof arranged so as to permit the brake pad to be inserted into the mounting structure in a transverse direction of the pad and at an angle to the circumferential direction of the structure and then for the brake pad to be pivoted about a center of rotation when a circumferential surface of the brake pad is in contact with a complementary circumferential surface of the structure, to be brought into a fitted position in the structure.

Advantageously this arrangement allows the brake pad to be fitted to the caliper in a manner that is less prone to jamming than the known radial way and may make fitting in the wrong orientation less likely or impossible due to there being more visual and mechanical clues of any such error. Further the arrangement may permit a smaller, simpler and lighter pad retainer to be used.

At least one brake pad may comprise a first circumferential surface having a profile that defines a part circular segment of a first fixed radius for contact with a complementary first circumferential abutment surface.

Advantageously this may enable the pivoting action to occur smoothly, and also to provide a large bearing contact area under braking to transmit brake forces loads from the pad to the corresponding support structure.

At least one brake pad may comprise a second circumferential surface, the second circumferential surface having a profile that defines a part circular segment of a second fixed radius, the second fixed radius being greater than the first fixed radius for contact with a complementary second circumferential abutment surface.

Advantageously this allows for the second circumferential surface and second abutment surface to additionally have a large bearing contact area under braking to transmit brake force from the pad to the corresponding support structure.

The formation may be located proximate a second circumferential abutment surface remote from the fixed center of rotation.

The formation may be located on a trailing side of the brake with respect the usual direction of rotation of the rotor.

The brake caliper may comprise a radial aperture dimensioned so as to permit the fitting and removal of at least one of the brake pads through the aperture with the caliper and rotor in place.

The disc brake may further comprise a brake carrier and the support structure may be located on the brake carrier.

A second aspect of the present invention provides a brake pad for fitment into a disc brake of the first aspect of the present invention wherein the brake pad comprises a retainer formation to permit a preferably push fit retention of the brake pad with a corresponding support structure of heavy vehicle disc brake.

The brake pad may comprise a first circumferential face having a profile that defines a part circular segment having a first fixed radius and a second circumferential face having a second fixed radius, the second fixed radius being greater than the first fixed radius.

The brake pad wherein the center of the second radius may substantially coincide with the center of the first radius.

A third aspect of the present invention provides a first and a second brake pad according to the second aspect of the present invention wherein the first and second brake pads are dimensioned such that when facing each other the brake pads have mirror symmetry in a parallel spaced relation with friction material facing material about a plane parallel to friction faces of the brake pads and equidistant from both brake pads.

A fourth aspect of the present invention provides a method of fitting a first or second brake pad to a disc brake according to the first aspect of the present invention, the method comprising the step of loading the first brake pad into a corresponding support structure such that it retained therein by the retainer formation.

A fifth aspect of the present invention provides a method of removing a first or second brake pad from a disc brake according to a first aspect of the present invention, the method comprising the steps of: a) moving the retainer formation into a released position and b) lifting the brake pad from the support structure.

BRIEF DESCRIPTION OF THE DRAWINGS

Embodiments of the present invention will now be described, by way of example only, with reference to the accompanying drawings, in which:

FIGS. 8, 9, 10, 11 and 12 are views enlarged of brake pads and brake pad support structures with pad retainer formations according to third, fourth, fifth, sixth and seventh embodiments of the present invention respectively;

FIGS. 13A and 13B are cross-sectional and side views of a brake pad and brake pad support with a pad retainer formation according to an eighth embodiment of the present invention;

FIGS. 14, 15 and 16 are views enlarged of brake pads and brake pad support structures with pad retainer formations according to ninth, tenth and eleventh embodiments of the present invention respectively.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disc Brake Structure

Figure 1:
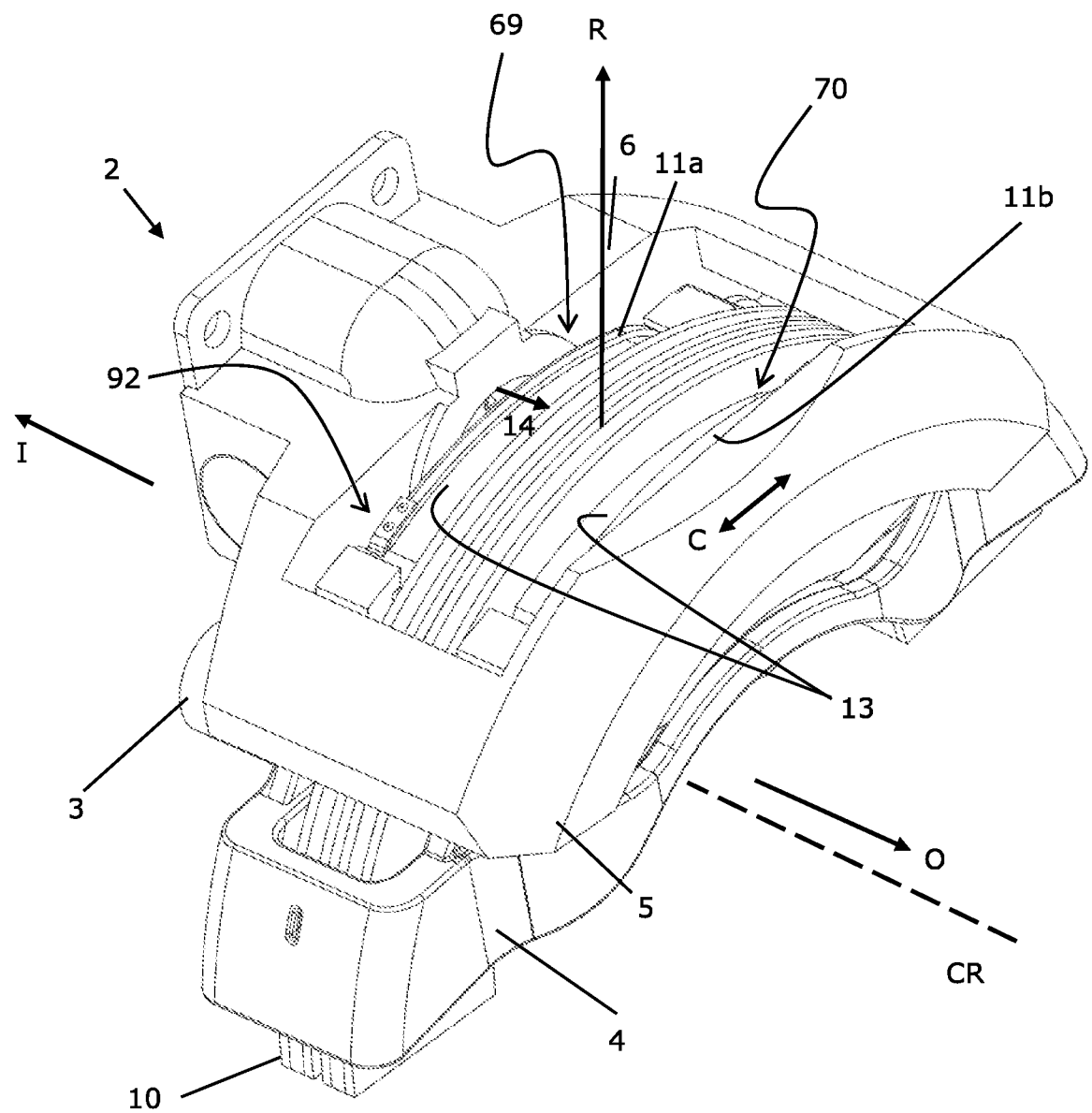
FIG. 1 is an isometric view of a disc brake, according to an embodiment of the present invention.

FIG. 1 illustrates a disc brake 2 of the present invention. The disc brake 2 incorporates an actuation mechanism comprising an operating shaft of the type described above that takes and amplifies an input force from an air actuator and transmits the force via a single piston to an inboard brake pad 11a. The piston has an adjustable length to account for wear of friction material 13 from the inboard brake pad 11a and an outboard brake pad 11b to maintain a suitable running clearance between the inboard and outboard brake pads 11a, 11b and rotor 10. Such a disc brake is suitable for a heavy commercial vehicle. This type of brake is particularly, but not exclusively, suitable for lighter duty heavy vehicles, for example smaller trucks, or a trailer of a tractor-trailer combination. In other embodiments the disc brake may be a twin piston brake—for example a variant of the applicant's existing ELSA 2 family of disc brakes.

Various orientations of the disc brake are described. In particular, the directions inboard and outboard refer to the typical orientation of the disc brake when fitted to a vehicle and with reference to the longitudinal center line of the vehicle. In this orientation the brake pad closest to the center of the vehicle is the pad directly actuated by an actuation mechanism and being the inboard pad, and the outboard pad being one mounted to a bridge portion of the caliper. Thus, inboard can be equated with an actuating side of the disc brake, and outboard with a reaction side. The terms radial (denoted by arrow R) describes an orientation with reference to the center of the wheel (rotor). Circumferential (denoted by arrow C), or also called tangential, describe orientations with respect to the brake rotor. Radial refers to a direction towards or away from the center of rotation of the brake rotor, whereas circumferential (C) describes a direction of rotation of the rotor about its center of rotation (denoted CR).

The disc brake 2 comprises a caliper 3 having a housing 6 to accommodate the actuation mechanism and which is slideably mounted on a carrier 4 for movement in an inboard-outboard direction (I-O in FIG. 1). The caliper also comprises a bridge that extends over the rotor 10 support the outboard brake pad 11b. The bridge 5 in combination with the sliding of the caliper enables the force from the operating shaft to be transmitted to the outboard brake pad 11b so as to clamp the rotor 10 between the inboard and outboard brake pads 11a, 11b so as to retard its rotation.

The caliper 3 can slide on the carrier 4 in an inboard-outboard direction, by way of first and second guide pins as is well known.

Brake Pad and Support Structure

An inboard brake pad 11a comprises a layer of friction material 13 and is arranged so that the friction material 13 faces a brake rotor 10 (also known as a brake disc). The inboard brake pad 11a is mounted on the carrier via an inboard brake pad support structure 69. In this embodiment, the inboard brake pad support structure 69 is a window or recess in a brake carrier, described in more detail below. The inboard brake pad 11a is moveable in the direction of arrow 14 against the brake rotor 10.

An outboard brake pad 11b, also with a layer of friction material 13, is also provided. The outboard brake pad 11b is mounted to an outboard brake pad support structure 70 as described in further detail below. Suitable means are provided to urge an outboard brake pad 11b against the opposite side of the rotor 10. In this embodiment, the caliper comprises a bridge 5 arranged so as to straddle the rotor 10 and to transmit the reaction force from an inboard operating shaft of the actuating mechanism to the outboard pad 11b. In this embodiment the housing 6 and bridge 5 are manufactured as a single monolithic casting, but in other embodiments, the bridge may be bolted or otherwise secured to the housing.

In this embodiment, a spreader plate is provided in the form of an enlarged outboard head of the piston. The main function of the spreader plate is to spread the load applied by the single piston across a greater proportion of the circumferential width of the inboard pad 11a, which is particularly useful for high pressure applications (e.g., an emergency stop), to more evenly distribute the load applied to the inboard and outboard brake pads 11a, 11b. There is also an effect on wear; i.e., wear closer to the center of the pad (where the piston is applied), and well as wear at the leading edge of the pad can be reduced, to provide a more even distribution of wear.

Figure 2:
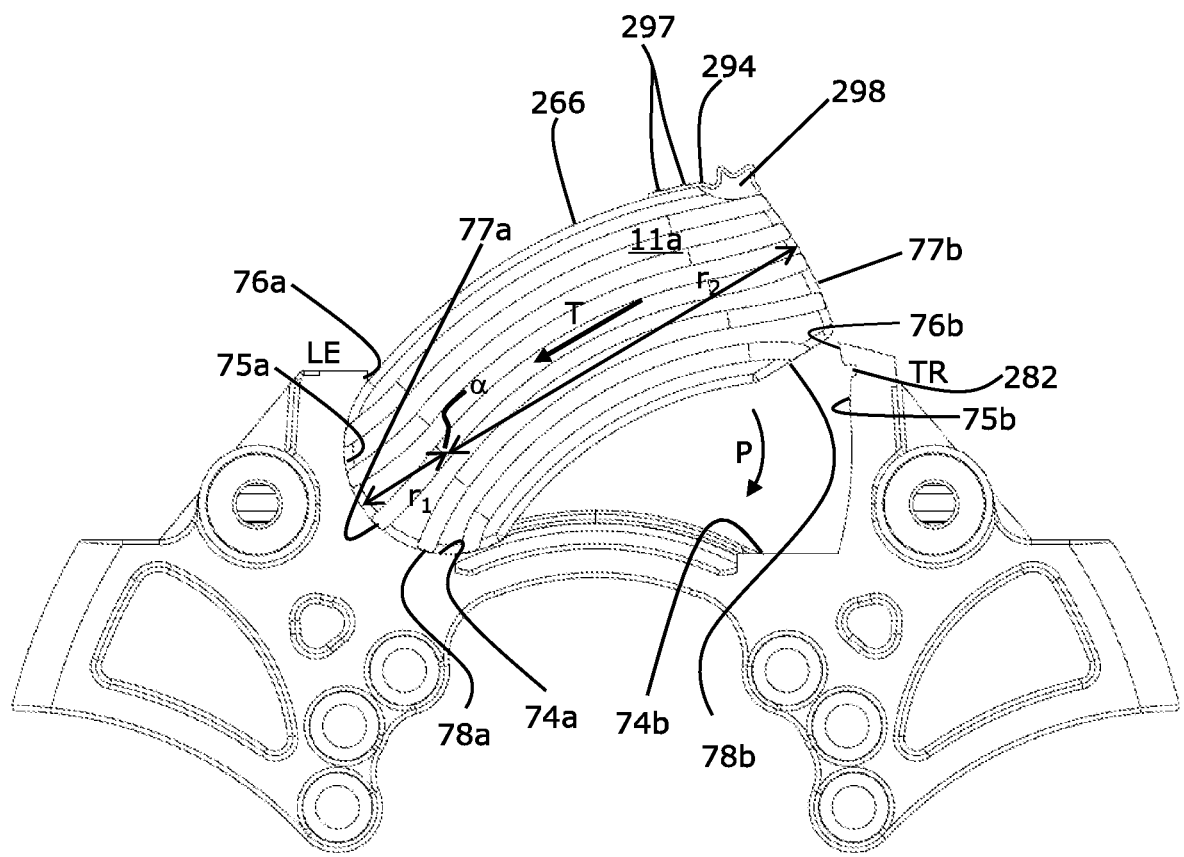
FIGS. 2 and 3 are side views of a brake pad and carrier of the disc brake of FIG. 1 in a part-fitted and fitted position respectively.

With reference to FIG. 2, the carrier 4 has radial pad abutment surfaces 74a, 74b to support the inboard pad 11a in a radial direction. The radial abutment surfaces 74a, 74b are located either side of an arched 'link' portion 4a of the carrier, the link portion 4a connecting the left and right sides of the carrier 4.

The carrier 4 further comprises a first and second circumferential pad abutment surfaces 75a and 75b. The radial pad abutment surfaces 74a, 74b and circumferential pad abutment surfaces 75a and 75b are machined in this embodiment, but they could be forged, or just left as cast as desired.

The circumferential and radial pad abutment surfaces 74a, 74b, 75a and 75b define the inboard pad support structure 69 that is arranged to support the inboard pad 11a in a radially inward and circumferential (i.e., rotational) direction. As the brake is actuated, the circumferential and radial pad abutment surfaces 74a, 74b, 75a and 75b react the torque that is created as the inboard pad 11a clamps the rotor 10. The circumferential and radial pad abutment surfaces 74a, 74b, 75a and 75b also act to locate the inboard brake pad 11a.

Figure 3:
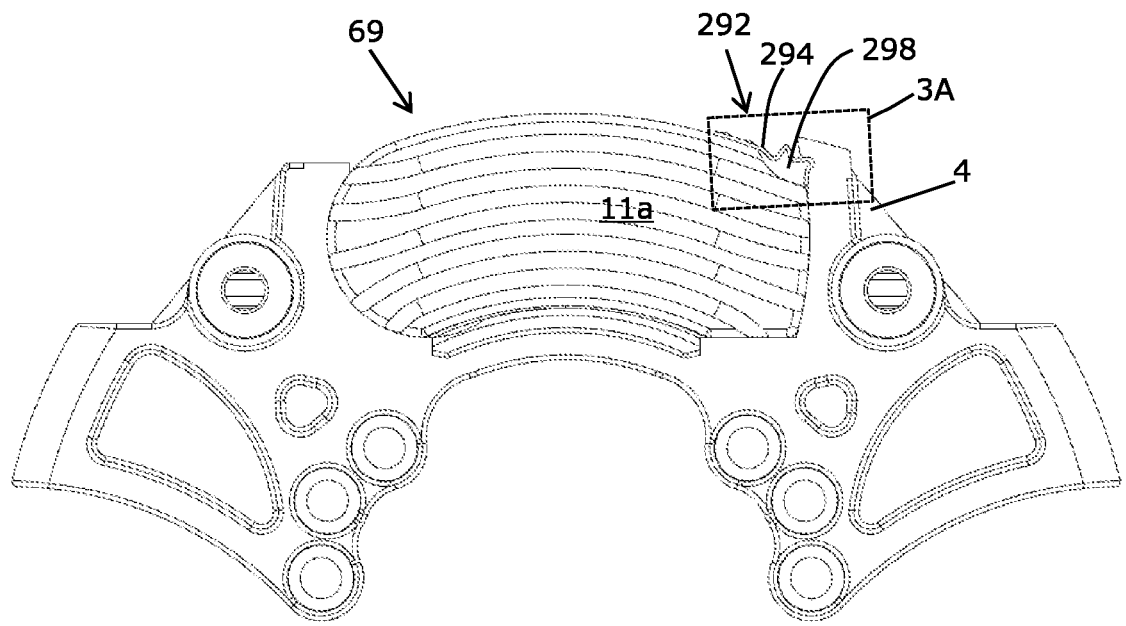

The inboard brake pad 11a and the corresponding inboard pad support structure 69 comprise complementary profiles on circumferential faces thereof arranged so as to permit the brake pad to be inserted into the mounting structure in a transverse direction T of the inboard brake pad 11a and at an angle to the circumferential direction C of the structure until the pad abuts the first circumferential abutment surface 75a, and then for the brake pad to be pivoted in a direction P about a fixed center of rotation a when the first circumferential surface 77a of the brake pad is in contact with the first circumferential abutment surface 75a of the structure to be brought into a fitted position in the structure. The fitted position is shown in FIG. 3.

In this embodiment, the first circumferential surface 77a of the inboard brake pad 11a has a profile that defines a part circular segment of a first fixed radius r1 for contact with the complementary first circumferential abutment surface 75a. It will also be appreciated that in this embodiment a first radial surface 78a of the brake pad is partially contiguous with the first circumferential abutment surface 77a. In other words, because the surface is curved it transmits force with both a circumferential and radial component in some locations.

In addition, the first circumferential abutment surface 75a extends around the first circumferential surface of the inboard brake pad 11a such that a gap distance from the radially outermost tip 76a of the first circumferential abutment surface 75a to a corresponding radially outer tip 76b of the second circumferential abutment surface 75b is less than the greatest distance between corresponding points on the two circumferential abutment surfaces 75a, 75b radially inward of the tips. In other words, a portion of the first circumferential abutment surface 75a radially outward of the brake pad extends above a portion of the inboard brake pad 11a at the first end thereof.

This means that in effect the brake pad is accommodated within a curved undercut defined by the first circumferential abutment surface 75a. This prevents the inboard brake pad 11a being lifted from the inboard pad support structure 69 by it pivoting about the second end of the brake pad rather than about the first end of the brake pad i.e., only fitting and removal in the way described below is possible when the disc brake 2 is assembled.

The second circumferential surface of the brake pad 77b has a profile that also defines a part circular segment of a second fixed radius r2. The second fixed radius is greater than the first fixed radius and is arranged to contact the complementary second circumferential abutment surface 75b, which is also part-circular with a similar radius.

In order that the inboard brake pad 11a, when fitted, has a large bearing area in contact with the second circumferential abutment surface 75b for transmitting the brake force under braking, the center of the second radius r2 substantially coincides with the center α of the first radius r1.

In this embodiment, the second radial surface of the brake pad 78b has a generally planar profile and is arranged to contact the complementary second radial abutment surface 74b, which is also generally planar.

The second radial abutment surface 74b, in contrast to the first, is arranged with a defined angle at its intersection to the second circumferential abutment surface 75b, in order to support the brake pad in a radially inward direction at its second end. In some variants of the carrier a stress-relief feature may separate the second radial and circumferential abutment surfaces 74b, 75b, however.

The first circumferential abutment surface 75a is arranged on a leading side (denoted LE) of the disc brake with respect the usual direction of rotation of the rotor 10 (clockwise in FIG. 2). The second circumferential abutment surface 75b is arranged on the trailing side (denoted TR). Thus, in the forward direction of movement of a vehicle to which the disc brake 2 is fitted, the forces acting on the inboard brake pad 11a tend to hold the brake pad within the pad support structure without additional retention structures coming into use.

However, since vehicles typically also maneuver in a reverse direction (at low speed and for a small proportion of their operating time), the geometry set out above may require a structure to counteract the forces acting on the inboard brake pad 11a when rotation of the rotor 10 is reversed. Thus, as is shown in FIG. 3, a brake pad retainer formation 192 is provided. This is discussed in more detail below.

In the disc brake 2 of FIG. 1 the outboard pad support structure 70 is also provided in the brake carrier 4 (in an outboard part) and is arranged so as to have a similar geometry of radial and circumferential abutment surfaces 74a, 74b, 75a, 75b in order to receive and support an outboard brake pad 11b with similar or identical shape to the inboard brake pad 11a. In other embodiments, the outboard pad may have a different geometry and this may be advantageous in some circumstances, dependent upon functional requirements of the brake and/or whether some form of "poka-yoke" feature (foolproofing of fitting of pads in inboard and outboard locations) is to be provided.

Further, in other embodiments, the outboard brake pad support structure may be provided by the brake caliper 3, rather than the brake carrier 4. This is achieved by mounting the outboard brake pad 11b to the bridge 5 of the caliper 3 which provides the outboard brake pad support structure. As such, the outboard brake pad 11b is supported radially and circumferentially by the caliper 3 when fitted in the outboard brake pad support structure. The equivalent radial and circumferential abutment surfaces of the outboard brake pad support structure 70 are provided in a face of the bridge 5 that is adjacent the rotor 10. However, as the position of the outboard pad 11b is fixed inboard-outboard with respect to the bridge 5, the abutment surfaces do not need to be as deep inboard-outboard as in the carrier 4, e.g., they may only be as deep as the corresponding circumferential and radial surfaces on the outboard brake pad 11b.

Brake Pad Construction

The construction of the backplate is now discussed in more detail in relation to FIGS. 2 to 6. The strengthening backplate 16 of the inboard and outboard brake pads 11a, 11b must have sufficient strength and integrity to withstand the forces acting on brake pads during braking, and as the vehicle to which the disc brake is fitted travels, e.g., over uneven surfaces.

Figure 6:
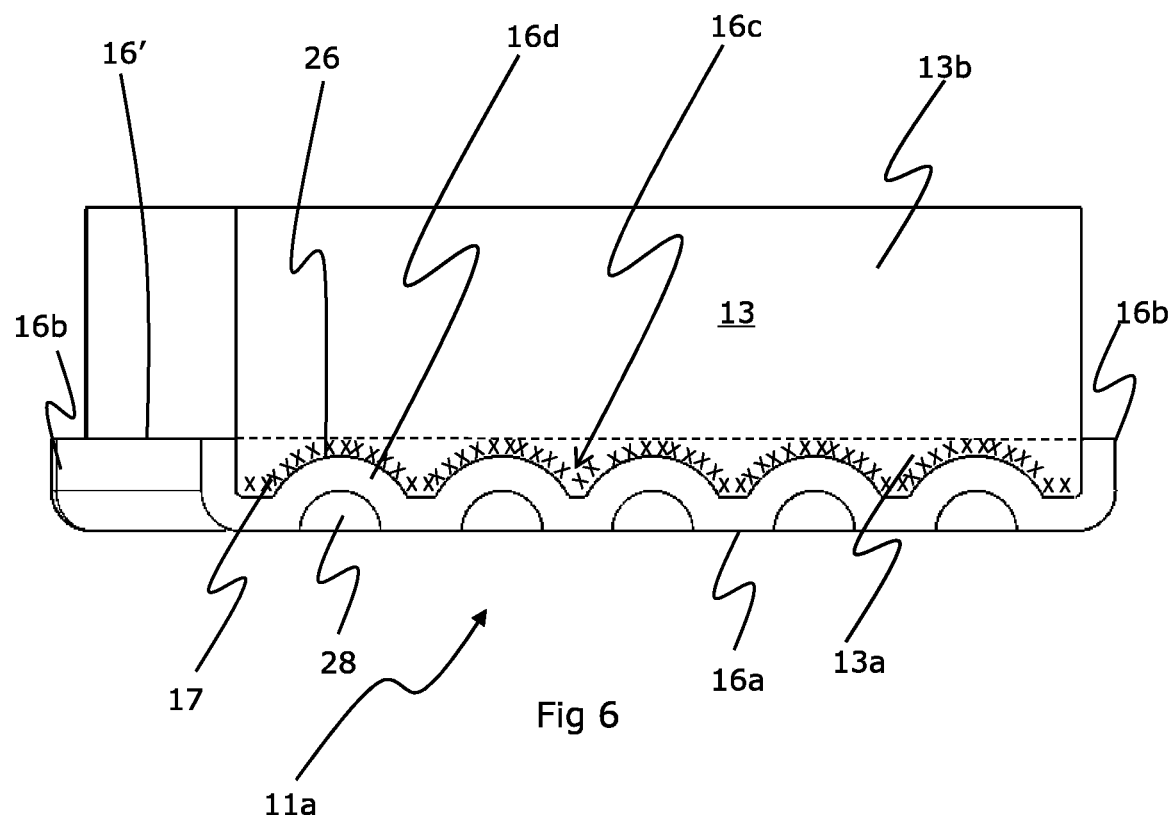
FIG. 6 is a cross-sectional view through the brake pad of FIGS. 4 and 5 on a plane 6-6.

As shown in FIG. 6, the strengthening backplate 16 comprises a rear wall 16a with an inner surface facing towards and for supporting the friction material 13 and an outer, opposing surface facing away from the friction material. When mounted for use, the inner surface faces the brake rotor 10 of the disc brake and the outer surface faces away from the rotor.

The strengthening backplate may comprise at least one stiffening flange extending from the inner surface side of the rear wall. The at least one stiffening flange may surround at least a perimeter portion of the rear wall. The stiffening effect of the flange helps to strengthen the backplate as well as increasing the area in contact with corresponding abutment surfaces of the disc brake 2.

In the embodiment depicted in FIGS. 2 to 6, the strengthening backplate comprises a stiffening peripheral flange 16b fully encircling the perimeter of the rear wall. The rear wall 16a defines a plane and the stiffening peripheral flange 16b extends substantially perpendicular from the inner surface side of the rear wall. First and second circumferential portions 167a, 167b of peripheral flange define the first and second circumferential surfaces 77a, 77b of the brake pad. First and second radial portions 168a, 168b of the peripheral flange define the first and second radial surfaces 78a, 78b of the brake pad.

The rear wall and at least one stiffening flange form a trough on the friction material side of the brake pad. In the embodiment depicted, the rear wall 16a and peripheral flange 16b define a trough 16c having a tub shape.

The trough is configured to accommodate at least one functional component of the brake pad. The functional component may be selected from a bonding to bond the friction material to the backplate, a thermal insulator to inhibit the transfer of heat from the friction material into the backplate of the brake pad, and a noise dampener to absorb noise generated by the brake pad and/or to alter the resonant frequency of the brake pad. The bonding may comprise a steel mesh around which the friction material may be formed.

The trough may additionally accommodate a rear portion of friction material.

In the embodiment depicted in FIGS. 3 to 7, the friction material is attached to the inner surface of the rear wall 16a using a friction material bonding 17. As shown, a rear portion 13a of the friction material and layer of friction material bonding 17 is located in the trough 16c of the backplate, whilst a front portion 13b of the friction material protrudes from the backplate. The rear portion may be a wear limit portion of the friction material and the outer edge of the flange 16' may define a wear limit of the friction material.

The trough is substantially filled by the at least one functional component (e.g., a bonding, thermal insulator and/or noise dampener), and optionally the rear portion of the friction material. Substantially filling the trough enhances the stiffening of the at least one flange and reduces the risk of plastic deformation during operation. By substantially filling the trough, the friction material at the circumferential surfaces of the backplate follows substantially the same profile as the backplate 16. The friction material is stepped back from the outer perimeter of the backplate by the thickness of the at least one flange. The at least one flange provides additional mechanical contact between the friction material and the backplate, aids bonding and reduces the risk of the friction material becoming separated from the backplate during braking. Further, by filling the trough, the risk of water and other foreign matter entering a gap between the at least one flange and the friction material etc. and causing corrosion is minimized.

By recessing the at least one functional component (e.g., a bonding, thermal insulator and/or noise dampener), and optionally a rear portion of the friction material in the backplate, the thickness of sacrificial friction material in the brake pad that may be worn away in operation can be increased and the lifespan of the brake pad improved.

The backplate 16 may alternatively or additionally comprise at least one stiffening rib to help strengthen the backplate. The at least one stiffening rib is configured to help strengthen the backplate with respect to the forces acting on the brake pad during use. The forces may include, for example, a retaining force from a retainer, an applied load of the piston, an applied clamping force, a drag braking force induced between the friction material and rotor, and/or abutment forces from the abutment surfaces. The at least one stiffening rib may also be configured to change the eigen frequency of the backplate and thereby help to reduce the generation of squeal noise during operation.

The at least one stiffening rib may comprise a recess and/or ridge arranged on the rear wall. The rib may comprise a recess formed in the rear wall 16a of the backplate, preferably on the outer surface of the rear wall. The recess may have any suitable cross-sectional profile including for example, a curved profile, flat-bottomed profile or saw-tooth profile. Preferably, a rib recess shaped on one surface of the rear wall forms a corresponding rib ridge on the opposing surface of the rear wall. For example, a rib recess formed on the outer surface of the rear wall forms a corresponding rib ridge on the inner surface of the rear wall. The ridge may aid the attachment of the insulator, noise dampener and/or friction material in the trough.

In the embodiment depicted in FIGS. 2 to 6, the backplate 16 comprises a plurality of elongate stiffening ribs 16d formed in the rear wall 16a to help strengthen the backplate. As shown in the FIGS. 4, 6 and 7, the ribs are elongate ridges 26 arranged on the inner face of the rear wall facing the friction material 13 and corresponding recesses 28 arranged on the outer face of the rear wall. The ridges 26/recesses 28 have a cross-sectional curved profile.

In this particular embodiment, the elongate stiffening ribs 16d are configured to help strengthen the backplate with respect to an applied load of the piston, an applied clamping force, a drag braking force induced between the friction material and rotor, and/or abutment forces from the abutment surfaces. The elongate stiffening ribs are also configured to tune the backplate and improve its noise behavior.

To improve the force distribution across the backplate the elongate stiffening ribs 16d extend across the full width of the rear wall 16a. To optimize the reaction of the brake pad to the drag brake force, the elongate stiffening ribs 16d are configured to follow the vector pathway of the tangential drag force acting across the rear wall. To counter abutting forces of the abutment surfaces acting on the brake pad, the elongate stiffening ribs 16d are configured to extend across the rear wall 16a between the first and second circumferential surface portions 167a, 167b of the peripheral flange and between the first and second radial surface portions 168a, 168b of the peripheral flange. To optimize the stiffening effect and help minimize plastic deformation of the backplate at the abutment interface, each stiffening rib is substantially perpendicular to the intersection between the rear wall and peripheral flange.

In some embodiments, the backplate may further or alternatively comprise at least one stiffening rib formed in the rear wall that is configured to strengthen the backplate with respect to retaining forces applied by a brake pad retainer, although this is not required in the present invention. The retaining forces generally act on a localized region of the backplate and so the at least one local stiffening rib is preferably arranged in the region of the rear wall adjacent to the brake pad retainer. To optimize the stiffening effect and help minimize plastic deformation of the backplate by the pad retainer each stiffening rib is orientated to extend in a substantially perpendicular direction to the interface between the pad retainer plate 92 and rear wall.

The provision of the at least one flange and/or at least one stiffening rib allows for the thickness of the backplate material to be reduced whilst maintaining a backplate with sufficient strength and integrity to withstand the braking forces and travel forces acting on the vehicle in which the disc brake is fitted.

The enhanced stiffening effect of the at least one flange (e.g., peripheral flange 16b) and/or the at least one stiffening rib (e.g., stiffening ribs 16d) allows the backplate 16 to be formed from relatively thin sheet metal material.

The sheet metal material preferably has a thickness of approximately 4 mm or less. The trough may preferably have a depth of between approximately 5 mm to approximately 7 mm. Backplates 16 can be formed from a sheet metal, e.g., sheet steel, having a thickness of between approximately 1 mm to approximately 4 mm, preferably approximately 3 mm.

By using relatively thin sheet metal material the overall mass of the backplate is minimized, which in turn leads to environmental and costs benefits. Also, the backplate may be press-formed from the sheet metal material and cheap to manufacture.

In the embodiment depicted in FIGS. 2 to 6, the backplate 16 is press-formed from a sheet steel plate having a thickness of approximately 3 mm, whereby the rear wall and peripheral flange are integrally formed from the same sheet of material as a starting point and the trough has a depth of approximately 7 mm.

The backplate is preferably manufactured from a blank of sheet metal plate (normally coils of sheet metal plate) and press-formed between appropriate contoured dies in a press to form the at least one stiffening rib and/or at least one flange. The method of making the backplate comprises the initial step of cutting a blank from sheet metal. The method may further comprise the step(s) of pressing the blank to form ridges/recesses so as to define at least one stiffening ribs and/or drawing the blank in a press to turn the outer edges of the sheet metal to an angle approaching 90° so as to form the rear wall and at least one flange.

In other embodiments, the backplate can be cast, or formed using other suitable processes.

The friction material 13 of the inboard and outboard brake pads 11a, 11b is mounted to a strengthening backplate 16 e.g., of metallic material. The friction material 13 at the circumferential surfaces of the backplate follows substantially the same profile as the backplate 16. However, for manufacturing reasons the friction material is stepped in from the entire perimeter surface by up to 4 mm. This arrangement optimizes the weight to friction material volume ratio of the brake pads, which is made possible by the simple pad retention arrangement in particular. The profile of the friction material and the backplate on the radially outermost and radially innermost edges (intermediate radial surfaces 78a, b) follows as closely as possible the contact area of the rotor so as to maximize the swept pad area.

Brake Pad Retainer Formation

As noted above, to counteract forces acting on the inboard brake pad 11a when the rotor is being braked from rotation in a reverse direction to normal, a brake pad retainer formation 292 is required. In this embodiment the pad retainer formation 292 is arranged to provide a push fit retention via interengagement with the support structure so as to simplify the fitting of the brake pad.

As can be seen most clearly in FIGS. 2 to 5, the pad retainer formation 292 comprises a resilient element in the form of a leaf spring 294. The leaf spring is arranged to interengage with a recess 282 in the second circumferential surface 75b. The recess 282 defines an abutment surface 284 that faces radially inwardly and therefore inhibits the removal of the inboard brake pad 11a once it has been fitted.

The leaf spring 294 has a non-linear form. In this embodiment the leaf spring is mounted to a radially outer surface 266 of the peripheral flange 16b. The leaf spring 294 curves radially inwards (clockwise as viewed in the Figures), then outwards (anticlockwise), inwards, outwards, inwards and outwards so that in a rest position, a free end of the leaf spring is substantially aligned with the second circumferential portion 167b of the peripheral flange 16b. The curves define a first radial projection 296a and a second radial projection 296b with a corresponding recess. This shape provides flexibility and compressibility to the leaf spring 294 to aid its retraction as a brake pad is fitted as described below, and to assist with the release of the retainer formation 292 as also described below.

In this embodiment the leaf spring 294 is mounted to the flange 16b as a separate component. This is achieved by rivets 297 in this embodiment. In other embodiments other fasteners may be used, the leaf spring may be spot welded, or the leaf spring and/or flange may be plastically deformed during brake pad manufacture to interengage.

In order for the leaf spring to be able to deflect during fitting, a recess or cutaway 298 is provided in the backplate 16 and friction material 13 at the location where the leaf spring is mounted. In this embodiment the location is the corner where the radially outer surface 266 and second circumferential surface 77b intersect. In this embodiment the flange 16b is omitted at this location, but in other embodiments the flange may be continuous but follow a concave path behind the leaf spring location.

Whilst the leaf spring 294 inhibits radial lifting, it will be appreciated that it nevertheless permits the inboard brake pad 11a to advance towards the brake rotor 10 for braking operations and to maintain a suitable running clearance as the friction material wears during use of the disc brake.

Fitting Operation

Fitting of the inboard brake pad 11a is illustrated in FIGS. 2 and 3. As can be seen in FIG. 2, the pad is inserted at an angle into inboard pad support structure 69 by being brought into contact with the first circumferential pad abutment 75a and is then pivoted in a clockwise direction as illustrated in FIG. 3. As this motion progresses, the second radial projection 296b contacts the radially outer tip 76b of the second circumferential pad abutment. The shape of the projection acts as a ramp surface and causes the leaf spring 294 to deflect resiliently into the recess 298, allowing the pivoting motion to continue with the second radial projection running along the second circumferential pad abutment 75b until the second radial surface 78b of the inboard brake pad 11a contacts the corresponding radial pad abutment surface 74b, and, in substantially the same position, the second projection 296b of the leaf spring 294 aligns with the recess 282 and the spring is allowed to relax so the projection 296b can occupy the recess. Therefore, fitting is a simple "push fit" operation in which the user is not required do anything other than apply enough force to pivot the inboard brake pad 11a into place.

In this position, as shown in FIG. 3, removal of the brake pad by lifting it is inhibited by the projection 296b contacting the abutment surface 284 and being blocked. In this regard it should be noted that the free end 299 of the leaf spring contacts the flange 16b of the backplate 16 and so blocks the leaf spring from pivoting in a clockwise direction to be retracted from the recess if a force is applied to the inboard brake pad 11a in an anticlockwise direction. In other words, the portion of the leaf spring 294 between the second projection 296b and the free end 299 acts as a strut to block retraction of the leaf spring in response to anticlockwise rotation.

The leaf spring 294 additionally acts as an anti-rattle spring that may prevent rattling occurring between the brake pad and both the circumferential and radial abutments.

Figure 3A:
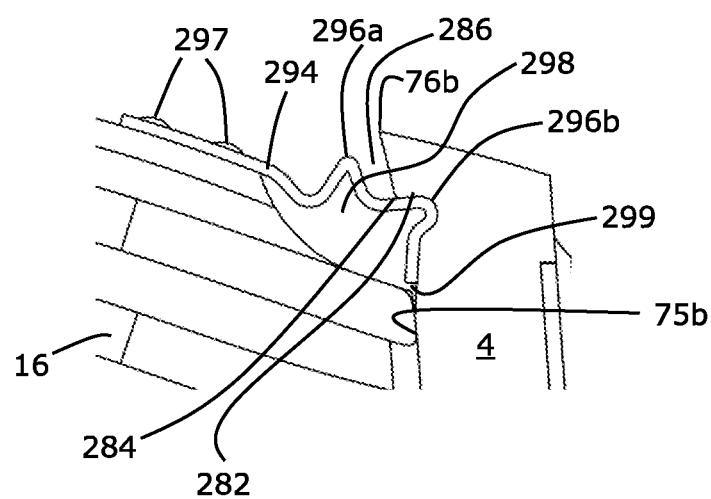
FIG. 3A is an enlarged view of the boxed portion of FIG. 3
Figure 4:
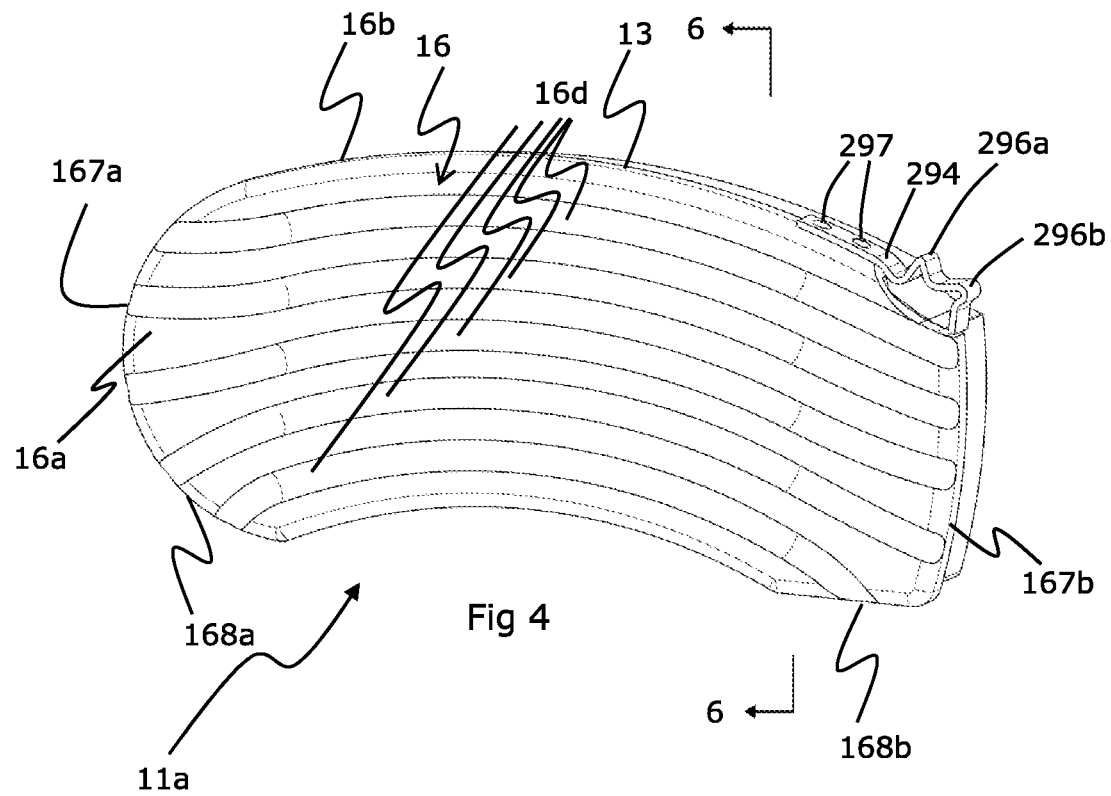
FIG. 4 is an isometric view of a brake pad of the disc brake of Figure.
Figure 5:
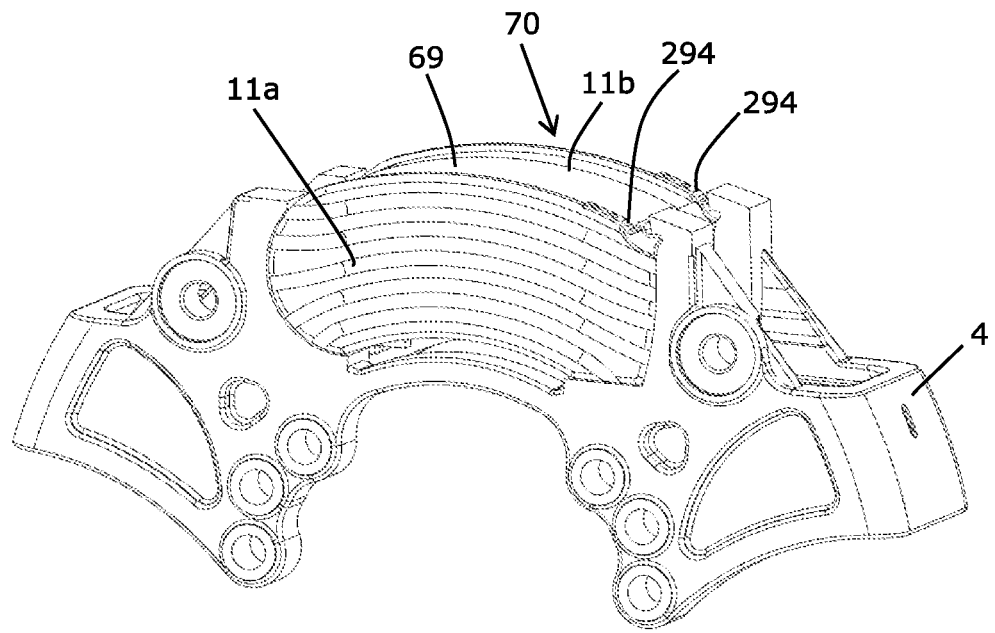
FIG. 5 is an isometric view of first and second brake pads of FIG. 1 mounted in the carrier.

When a user wishes to remove a pad for replacement or inspection, it can be seen from FIGS. 3, 3A and 4 that a channel 286 is defined between the first radial projection 296a and the second circumferential pad abutment 75b. In order to release the pad, a user inserts a flat tipped tool, such as a flat bladed screwdriver, into this channel, and by pivoting the screwdriver is able to deflect the leaf spring such that it is clear of the recess 282 and does not block pivoting of the pad in an anticlockwise direction back into the position of FIG. 2 from which it can be removed.

It will be appreciated that this procedure is significantly more user-friendly and less prone to error than the conventional approach that utilized a pad strap that extends over both brake pads as is shown in the prior art.

A fitting operation of the outboard brake pad 11b is similar to that of the inboard brake pad 11a.

So as to maintain the benefit of the outboard brake pad 11b being inherently retained in the outboard pad support structure 70 in the normal rotational direction, in this embodiment, the inboard and outboard brake pads 11a, 11b are shaped such that when facing each other in a parallel relationship with friction material facing friction material, the inboard and outboard brake pads 11a, 11b have mirror symmetry about a plane parallel to friction faces of the inboard and outboard brake pads 11a, 11b and rotor 10.

Thus, when fitted within the disc brake 2 as illustrated in FIG. 1, the inboard and outboard brake pads 11a, 11b have mirror symmetry about a plane normal to the center of rotation CR of the rotor 10 at the axial midpoint of the rotor.

This arrangement means that the brake pad retainer formation 292 for the outboard brake pad 11b is at the same trailing side of the pad as for the inboard brake pad, and the corresponding recess to receive the formation is also on the trailing circumferential abutment. A benefit of this pad shape is that it inherently provides a poka-yoke feature that prevents an individual pad being fitted in a reversed orientation within its corresponding support structure (i.e., with the backplate rather than friction material facing the rotor.

Variants

Further embodiments of the present invention are illustrated in FIGS. 7 to 16. Those parts that differ from the first embodiment are denoted by a numerical prefix that increases by one in each successive embodiment. Only differences with the first embodiment are discussed below to avoid repetition.

Figure 7:
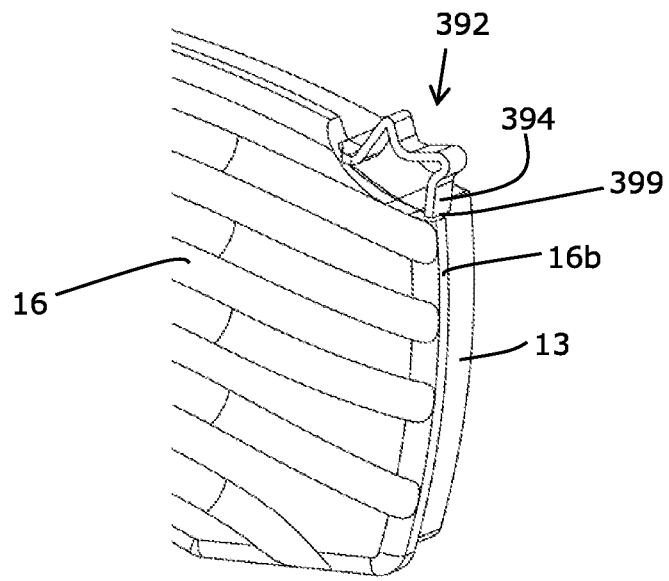
FIG. 7 an isometric view of a portion of a brake pad according to a second embodiment of the present invention.

In FIG. 7, a pad retainer formation 392 comprises a resilient element in the form of a leaf spring 394. In FIG. 7 the leaf spring 394 has a similar shape to that of the first embodiment, but instead of being mounted to the outer face of the flange 16b is mounted to the inner face (i.e., within the trough 16c). This may be achieved by any of the mounting methods described in relation to the first embodiment. A free end 399 of the leaf spring contacts the flange 16b of the backplate 16 and so blocks the leaf spring from pivoting in a clockwise direction to be retracted from the recess if a force is applied to the inboard brake pad 11a in an anti-clockwise direction. Further the leaf spring 394 may be integrally and monolithically be formed from the same material of the backplate 16, as an extra "tongue" of material that is shaped folded inwardly through 180° into a face contacting relationship with the flange 16b.

Figure 8:
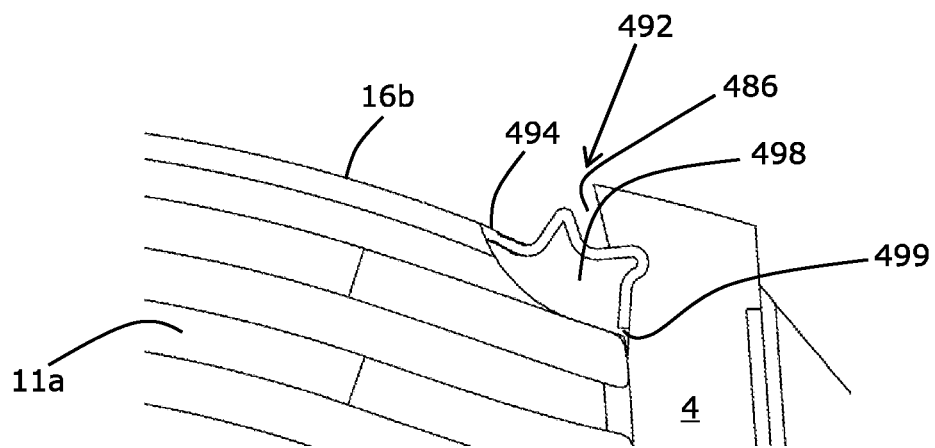

In FIG. 8, a pad retainer formation 492 comprises a resilient element in the form of a leaf spring 494. In FIG. 8, the leaf spring 494 also has a similar shape, but is formed as an integral and monolithic continuation of the material of the flange 16b i.e., at least in the location of the recess 498, the flange material is separated from the rear wall 16a. A channel 486 is defined between the first radial projection and the second circumferential pad abutment. A free end 499 of the leaf spring 494 contacts the flange 16b of the backplate 16 and so blocks the leaf spring from pivoting in a clockwise direction to be retracted from the recess if a force is applied to the inboard brake pad 11a in an anticlockwise direction.

Figure 9:
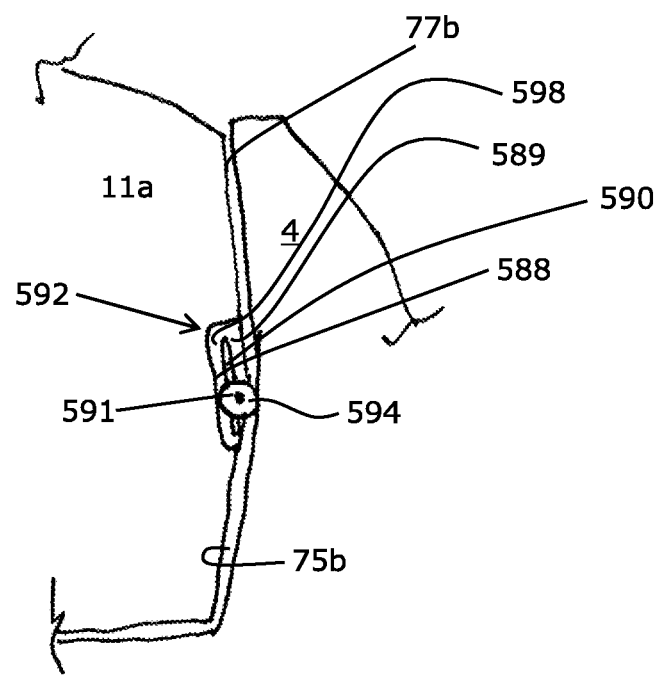

In FIG. 9, a pad retainer formation 592 comprises a cylindrical roller located within a wedge-shaped recess 598 to define a roller-ramp surface 588 that works in conjunction with the second circumferential pad abutment 75b to act as a one-way sprag clutch that wedges the inboard brake pad 11a in place to inhibit its removal. The roller 594 is held within a suitable cage 589 e.g., that has at least one slot 590 (one visible) to receive a stub axle 591 at each end of the roller. In this embodiment no recess is required in the second circumferential abutment 75b and no resilient element is necessary as the roller may operate under gravity. The recess 598 may be provided in alternative radial locations on the second circumferential surface 77b of the inboard brake pad 11a.

Figure 10:
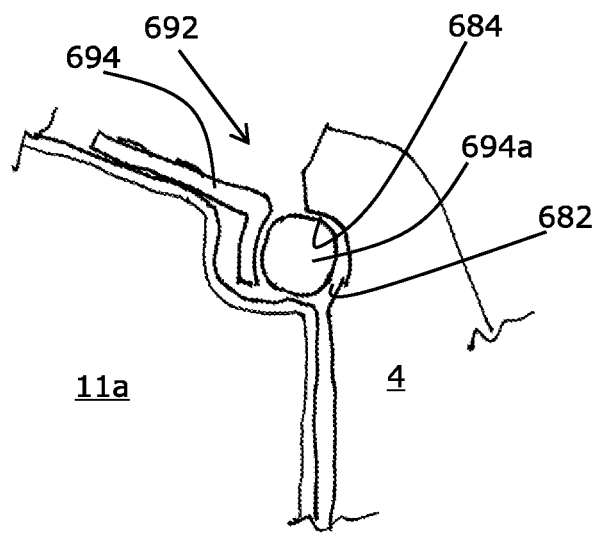

In FIG. 10, a pad retainer formation 692 comprises a resilient element in the form of a leaf spring 694, which operates in conjunction with a roller 694a that is arranged to selectively engage the recess 682. The roller may be held in a suitable cage. The recess 682 defines an abutment surface 684 that faces radially inwardly and therefore inhibits the removal of the inboard brake pad 11a once it has been fitted.

Figure 11:
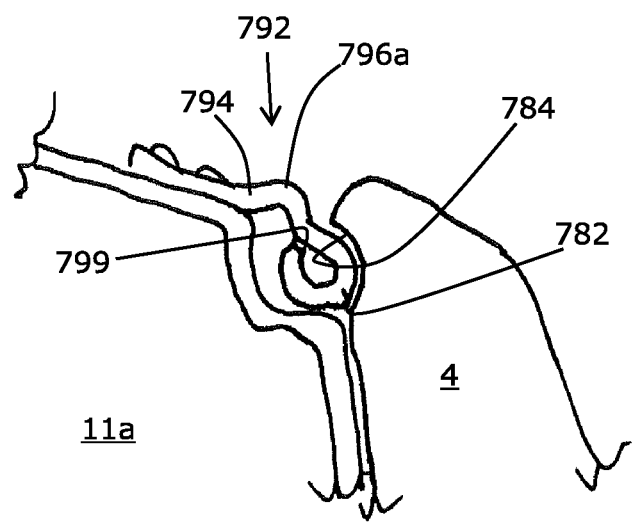

In FIG. 11, a pad retainer formation 792 comprises a resilient element in the form of a leaf spring 794. FIG. 11 illustrates that leaf spring 794 is formed into an alternate shape than the first embodiment. Namely, the leaf spring 794 is formed into a circular shape in place of the second radial projection, in which the free end 799 of the leaf spring 794 is curved around into contact with the leaf spring 794 near the first radial projection 796a. The recess 782 defines an abutment surface 784 that faces radially inwardly and therefore inhibits the removal of the inboard brake pad 11a once it has been fitted.

In FIG. 12, a pad retainer formation 892 comprises a resilient element in the form of a leaf spring 894. In FIG. 12, the leaf spring 894 has a first radial projection 896a, but this transitions into a tab 896b in place of the second projection, orientated such that the free end 899 projects into the recess 882 and the radially outer face of the leaf spring adjacent the free end 899 contacts the abutment surface 884 to inhibit removal. To allow push-fitting of the pad in this embodiment, the tip 876 of the second circumferential abutment may be chamfered.

In the embodiment of FIGS. 13A and 13B a portion of one of the recesses 28 define by the stiffening ribs forms the recess 998 to accommodate the resilient element. In this embodiment the resilient element is a helical compression spring 994 that urges a spherical ball 994a into the recess 982 of the carrier so it contacts surface 984 to inhibit removal. The compression spring 994 and ball 994a may be retained within a suitable cover within the recess. The recess 982 in this embodiment is provided between the second radial pad abutment surface 74b and second circumferential pad abutment surface 75b. Such recesses are known per se in the art for conventional carriers with parallel sided circumferential abutments as stress relief features, and thus in this embodiment the additional use of such a feature for the recess 282 may avoid additional machining operations.

In FIG. 14, a pad retainer formation 1092 comprises a recess 1082 with an angled undercut abutment 1084 and complementary projection 1094 on a radially inner face the brake pad. This configuration utilizes the typical clearance CL of approximately 2 mm circumferentially between the pad 11a and the circumferential pad abutments 75a, 75b such that the projection 1094 can clear the abutment 1084 when pivoted into place when the pad is shifted as far as possible to the right and has essentially no clearance between the second circumferential pad abutment and the second circumferential surface 77b. However, when braking a movement in reverse direction of the vehicle, the pad is naturally shifted to the left as depicted in FIG. 14 with all of the clearance CL at the right-hand side. The abutment 1084 and projection 1094 contact in this position. Thus, the force vector FL that tends to lift this end of the inboard brake pad 11a when braking in this direction is reacted by a reaction force FR between the abutment 1084 and projection 1094 and the brake pad is prevented from lifting.

The embodiment of FIG. 15 is similar to that of FIGS. 13A and 13B, except that a pad retainer formation 1192 comprises a leaf spring 1194 that is formed from a portion of the flange 16b at the intersection of the second radial surface 78b and second circumferential abutment surface 77b that is separated from the rear wall 16a and bent outwardly so that the free end 1199 engages against the abutment 1184. A recess 1182 is provided.

Figure 16:
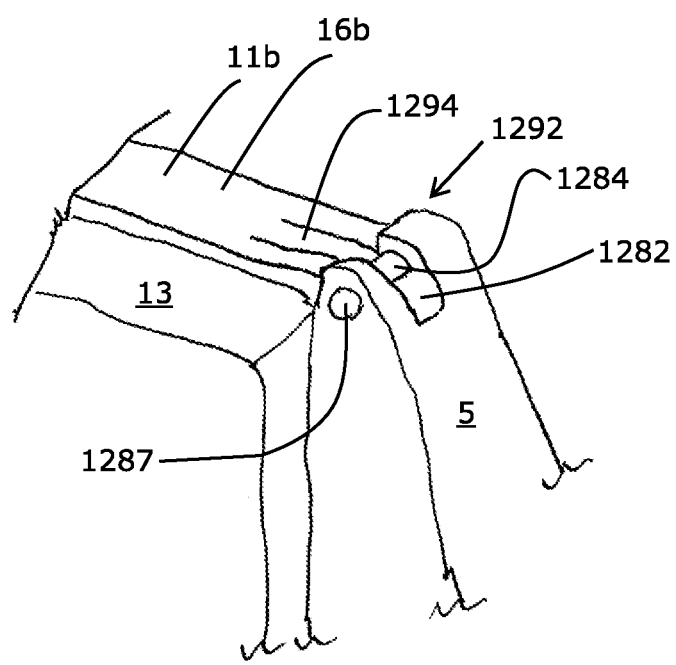

In FIG. 16 an arrangement best suited to retaining an outboard brake pad 11b in a structure that is part of the caliper 3 bridge 5 is depicted as it restricts relative movement of the brake pad relative to the support structure in the direction of the rotor (which is permitted in the other embodiments as there is nothing to block such movement. In this embodiment the leaf spring 1294 is a tongue formed from just part of the width of the flange. In addition, the recess 1282 in the bridge is a slot that aligns with a pad retainer formation 1292, in this case a leaf spring 1294. The slot defines a clevis and a clevis pin 1287 extends through bores in the clevis to act as the abutment 1284 and retain the leaf spring. The pin 1287 may be removed to allow the inboard brake pad 11*b* to be lifted.

It will be appreciated that numerous changes may be made within the scope of the present invention. For example, whilst the leaf spring in the depicted embodiments has a free end in other embodiments both ends of the leaf spring may be connected to the remainder of the brake pad. In other embodiments the retainer formation may be formed as a self-contained unit that mounts in a space formed within the trough or tub defined by the backplate 16, or a recess may be formed outside the trough shape.

It will be appreciated that the circumferential surfaces may not be provided as an uninterrupted arc of a single radius, but may instead be two or more arcs connected by flats or alternative shapes. The brake pads may be manufactured in a more conventional manner, e.g., utilizing a cast backplate or a stamped backplate. In some embodiments, rather than a curve, the circumferential pad surfaces may comprise a series of flats with angled relative to each other in order approximate to a curve. Such an arrangement would still permit the pad to be pivoted about a fixed center of rotation, provided the corresponding pad abutment surface is itself part-circular.

Figure 17:
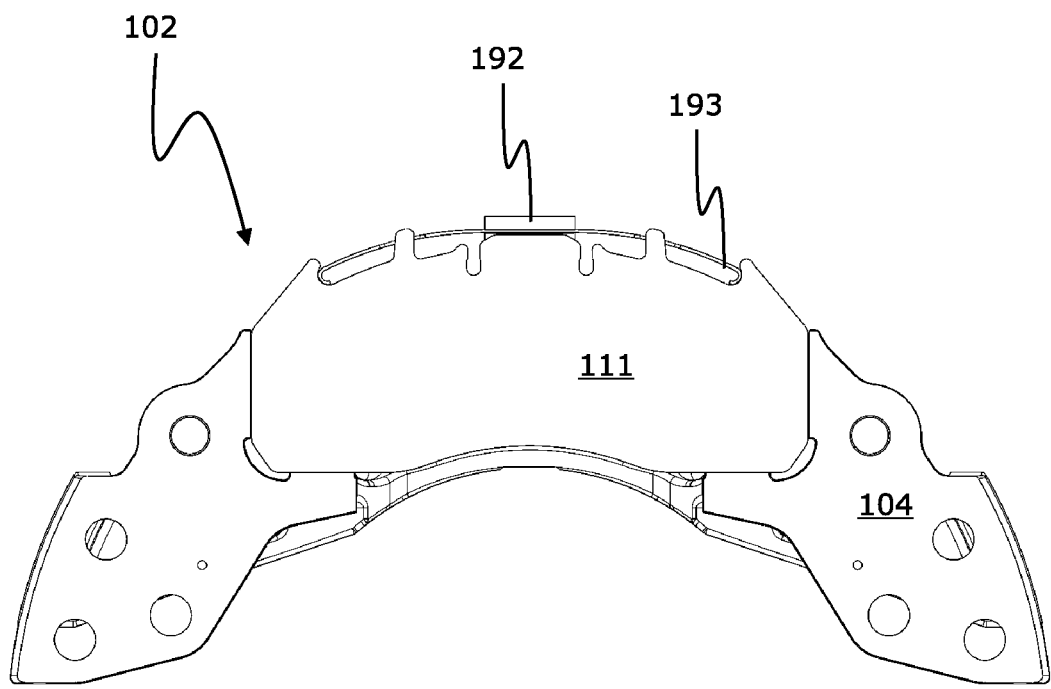
FIG. 17 is a side view of a known brake pad and carrier.

The retainer formation may be used on other types of brake pads. For example, a brake pad of the type shown in FIG. 17 with parallel circumferential sides may be adapted to include a retainer formation of the present invention. However, it may be necessary for formations to be proved on both the leading and trailing sides to ensure retention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake comprising:
a brake pad for selectively contacting a face of a brake rotor,
a brake caliper for confining the brake pad in at least an inboard-outboard direction;
an actuation mechanism for selectively bringing the brake pad into contact with the brake rotor, and
a brake pad support structure for restraining the brake pad in a circumferential direction;
wherein the brake pad comprises a moveable pad retainer formation configured to permit assembly and retention of the brake pad in the brake pad support structure such that the brake pad is held within the brake pad support structure for operation of the disc brake and the pad retainer formation is located at a corner of the brake pad at which a radially outer surface and a circumferential surface of the brake pad intersect.

2. The disc brake of claim 1 wherein the pad retainer formation is configured to permit a push fit assembly of the brake pad in the brake pad support structure.

3. The disc brake of claim 1 wherein retention of the brake pad is achieved by an interengagement of the pad retainer formation with a complementary formation of the brake pad support structure.

4. The disc brake of claim 3 wherein the pad retainer formation comprises a resilient element arranged to be deflected so as to achieve the interengagement.

5. The disc brake of claim 4 wherein the resilient element comprises a leaf spring.

6. The disc brake of claim 5 wherein the leaf spring comprises at least a first curve in a first direction.

7. The disc brake of claim 6 wherein the leaf spring comprises a second curve in a second direction opposite to the first direction.

8. The disc brake of claim 4 wherein the brake pad comprises friction material and a backplate to support the friction material.

9. The disc brake of claim 8 wherein the resilient element is integrally and monolithically formed with the backplate.

10. The disc brake of claim 9 wherein the backplate is formed at least in part of a sheet metal material and the resilient element is formed from the sheet metal material.

11. The disc brake of claim 3 wherein the brake pad support structure comprises an abutment, the abutment being located such that the pad retainer formation is able to move into contact with the abutment as part of a push fit assembly of the brake pad in the brake pad support structure.

12. The disc brake of claim 1 wherein the pad retainer formation comprises a feature, accessible by a user in a fully assembled state of the disc brake, to permit a disengagement of the brake pad from the brake pad support structure, wherein the feature is one of a recess to receive a tool such as a screwdriver and a projection tab to permit disengagement without the tool.

13. A disc brake comprising:
a brake pad for selectively contacting a face of a brake rotor, and
a brake pad support structure for restraining the brake pad in a circumferential direction;
wherein the brake pad comprises a moveable pad retainer formation to permit assembly and retention of the brake pad in the brake pad support structure such that the brake pad is held within the brake pad support structure for operation of the disc brake;
wherein the brake pad and the brake pad support structure comprise complementary profiles on circumferential faces thereof configured to permit the brake pad to be inserted into the brake pad support structure in a transverse direction of the brake pad and at an angle to the circumferential direction of the brake pad support structure and then for the brake pad to be pivoted about a center of rotation when a circumferential surface of the brake pad is in contact with a complementary circumferential surface of the brake pad support structure to be brought into a fitted position in the brake pad support structure;
wherein the pad retainer formation comprises a resilient element adapted to be deflected so as to achieve push fit assembly and retention by an interengagement of the pad retainer formation with a complementary formation of the brake pad support structure;
wherein the brake pad further comprises friction material and a backplate to support the friction material and the resilient element is mounted to or integrally and monolithically formed with the backplate; and wherein a shape of the resilient element acts as a ramp surface to help locate the brake pad within the brake pad support structure.

14. The disc brake of claim 13 wherein the brake pad comprises a first circumferential surface having a profile that defines a part circular segment of a first fixed radius for contact with a complementary first circumferential abutment surface, wherein the brake pad comprises a second circumferential surface, the second circumferential surface having a profile that defines a part circular segment of a second fixed radius, the second fixed radius being greater than the first fixed radius for contact with a complementary second circumferential abutment surface.

15. The disc brake of claim 13 wherein the pad retainer formation is located proximate a second circumferential abutment surface remote from a fixed center of rotation, wherein the pad retainer formation is located on a trailing side of the disc brake with respect to a usual direction of rotation of the brake rotor.

16. The disc brake of claim 1 wherein the brake caliper comprises a radial aperture dimensioned so as to permit fitting and removal of the brake pad through the radial aperture with the brake caliper and brake rotor in place.

17. A brake pad comprising:

a pad retainer formation for permitting push fit retention of the brake pad within a support structure of a disc brake, wherein the pad retainer formation is located at a corner of the brake pad at which a radially outer surface and a circumferential surface of the brake pad intersect.

18. The brake pad of claim 17 further comprising a first circumferential face having a profile that defines a part circular segment having a first fixed radius and a second circumferential face having a second fixed radius, the second fixed radius being greater than the first fixed radius, wherein a center of the second fixed radius substantially coincides with a center of the first fixed radius.

19. The brake pad of claim 17 wherein the pad retainer formation comprises a resilient element adapted to be deflected so as to achieve push fit retention by an interengagement of the pad retainer formation with a complementary formation of the support structure, and wherein the brake pad further comprises friction material and a backplate to support the friction material and the resilient element is integrally and monolithically formed with the backplate, wherein the backplate is sheet metal material less than 4 mm thick, and the resilient element is formed from the sheet metal material.

20. The disc brake of claim 13 wherein the resilient element comprises a leaf spring having a first radial projection and a second radial projection.

* * * * *